United States Patent [19]

Russell et al.

[11] 4,259,837

[45] Apr. 7, 1981

[54] WATER AND STEAM INJECTION SYSTEM FOR EMISSION CONTROL OF GAS TURBINES

[75] Inventors: John N. Russell, Burnt Hills; David W. Smith, Schenectady; Joseph C. McMullen, Scotia, all of N.Y.

[73] Assignee: General Electric Company, Schenectady, N.Y.

[21] Appl. No.: 48,060

[22] Filed: Jun. 13, 1979

[51] Int. Cl.³ .................................................. F02C 6/00
[52] U.S. Cl. ..................................... 60/39.55; 60/39.05
[58] Field of Search ................. 60/39.02, 39.05, 39.53, 60/39.54, 39.55; 364/431

[56] References Cited

U.S. PATENT DOCUMENTS

| | | | |
|---|---|---|---|
| 3,693,347 | 9/1972 | Kydd et al. | 60/39.05 |
| 3,868,818 | 3/1975 | Itoh | 60/39.15 |
| 4,044,549 | 8/1977 | Zwick | 60/39.02 |
| 4,160,362 | 7/1979 | Martens et al. | 60/39.18 B |

OTHER PUBLICATIONS

Knox, W. M. et al., "Water and Steam . . . Control", 26th General Electric Gas Turbine State of the Art Seminar, Jun. 18, 1978.

*Primary Examiner*—Jerry W. Myracle
*Attorney, Agent, or Firm*—Jerome C. Squillaro

[57] ABSTRACT

A control system for the injection of water or steam into the combustion chambers of a combustion turbine for reducing the emission of oxides of nitrogen in the exhaust gas of a combustion turbine is described. The control system includes a water control valve having a linear flow versus stroke characteristic which is controlled by an error signal representing the difference between a predetermined water-to-fuel schedule and the actual water-to-fuel schedule. Instruments for monitoring and recording water and fuel flow are also described.

8 Claims, 3 Drawing Figures

WATER AND STEAM INJECTION SYSTEM FOR EMISSION CONTROL OF GAS TURBINES

The present invention relates to a control system for the injection of water or steam into the combustion chamber of a gas turbine for the purpose of reducing the emission of oxides of nitrogen in the turbine exhaust.

Recent governmental regulations on emissions from stationary gas turbines limit the emission of oxides of nitrogen. Where water injection is utilized for emission control, the regulations also require the continuous monitoring of water injection flow and other turbine parameters to verify that regulations are being met.

Various techniques for steam and water injection are described in U.S. Pat. No. 3,693,347, 4,044,549 and 4,084,934. Such approaches to emission control, in general, have not proved to be entirely satisfactory. Accordingly, there is a need for a system for controlling and monitoring of water or steam injection into a stationary gas turbine to ensure compliance with the emission requirements.

It is therefore an object of this invention to provide a water or steam injection system to limit the emission of nitrogen oxides (NOx) from a gas turbine and to monitor the system performance for compliance with applicable regulations.

SUMMARY OF THE INVENTION

Water or steam injection into the combustion system of a gas turbine is controlled by a digitally actuated control valve having a linear flow versus stroke characteristic. The total water flow to the turbine is scheduled as a function of fuel flow and means are provided for monitoring fuel flow and water flow to the turbine; means are also provided for scanning these monitored functions, calculating a water error signal based on fuel flow and, if necessary, increasing or decreasing the water flow in a predetermined manner to ensure the total water flow to the turbine is maintained in accordance with a water to fuel control schedule.

DESCRIPTION OF PREFERRED EMBODIMENT

The present invention will be described with respect to the water injection system illustrated in FIG. 1. However, from the following description, those skilled in the art can readily appreciate that the control system described herein may also be utilized for steam injection.

Figure 1:
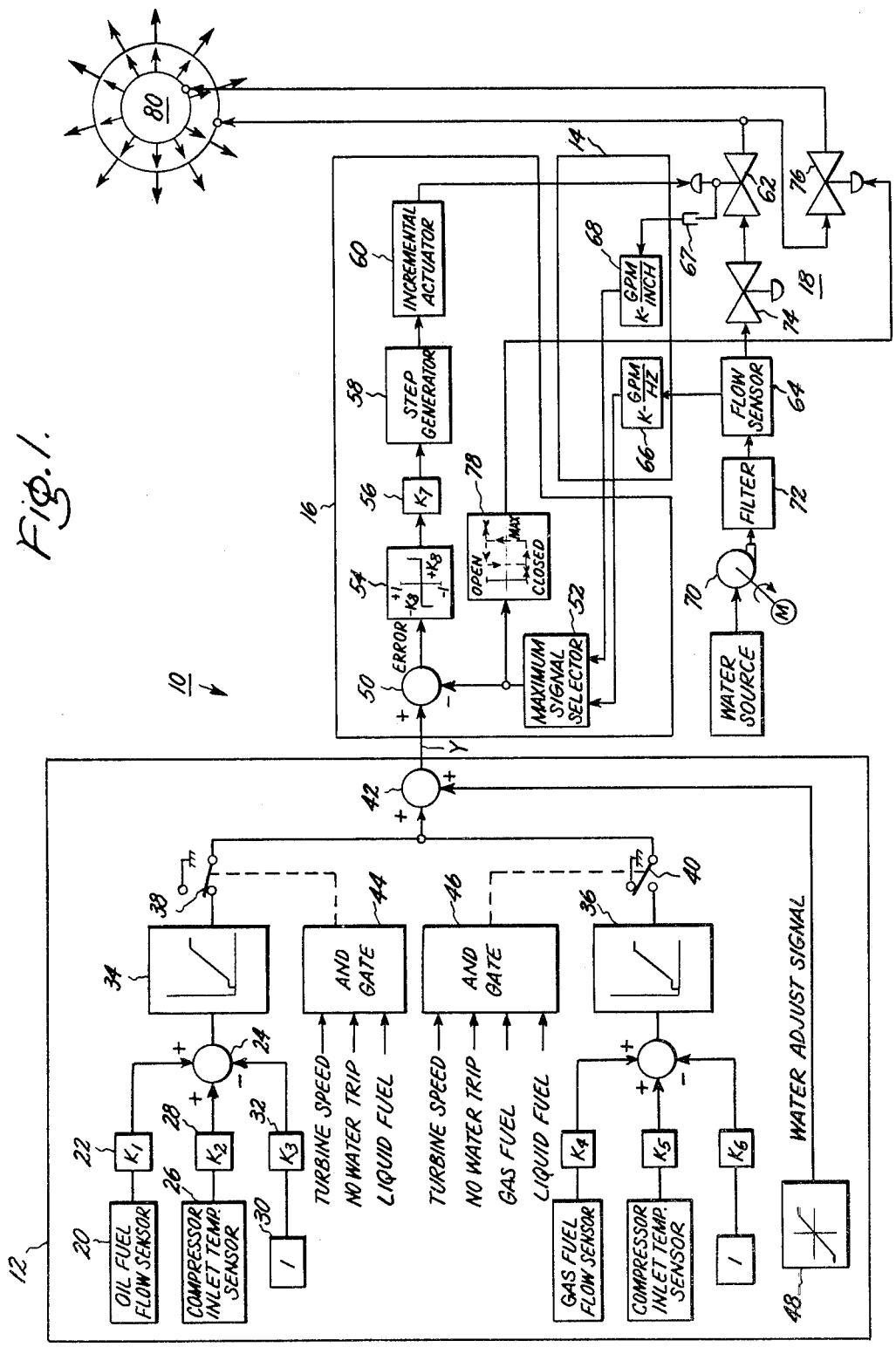
FIG. 1 is a schematic illustration of a water injection control system in accordance with one embodiment of the present invention.

Referring now to FIG. 1, a water injection control system 10 is illustrated as comprising a fuel monitoring section 12, a water monitoring section 14, a computational section 16 and a water control section 18.

The fuel monitoring section 12 includes an oil fuel flow sensor 20 providing an electrical output signal having a magnitude proportional to fuel flow. The output of the fuel flow sensor 20 is connected to a constant function generator 22 having its output connected to an electrical summing network 24. A second input to the summary network 24 is provided from a compressor inlet temperature sensor 26 through a constant function generator 28. A fixed bias signal 30 is coupled to a constant function generator 32 which is also algebraically summed in the summing network 24. The output of the summary network 24 is connected to a function generator 34 which provides an output signal to water flow, in gallons per minute, proportional to the liquid fuel flow, in gallons per minute, for example.

The fuel monitoring section 12 also includes a similar arrangement for monitoring the gas fuel flow in the event the gas turbine is operated with gas fuel as opposed to oil fuel. The components illustrated for monitoring gas fuel flow are similar to those described above with respect to the oil fuel flow and hence will not be discussed further. The outputs of the liquid fuel function generator 34 and the gas fuel function generator 36 are respectively connected through switches 38 and 40 to an input of an electrical summing network 42. The electrical switches 38 and 40 which are illustrated functionally as relay operated switches, may take various forms including well known electronic switches. Switches 38 and 40 are controlled by logic AND-gates 44 and 46, respectively. AND-gate 44 includes a first input which is a logic 1 whenever the gas turbine speed is above 95%. A second input to AND-gate 44 is a logic 1 when the water system (described more fully below) is functioning properly. This signal is illustrated in FIG. 1 as a no-water trip signal. A third input to the AND-gate 44 is a logic 1 when the liquid fuel system is operational. Hence, before functional switch 38 is closed, the turbine speed must be above 95%, there must be no-water trip and the liquid fuel system must be on. When these three conditions are met, the functional switch 38 is closed and functional switch 40 is opened since a logic zero appears at the liquid fuel input to logic AND-gate 46. However, AND-gate 46 also includes a fourth input which is a logic 1 whenever the gas fuel system is on. Those skilled in the art can readily appreciate that in the event that the gas turbine is operated on gas fuel as opposed to oil fuel, the functional switch 38 would be opened and functional switch 40 would be closed; therefore, only one of the two signals from the function generators 34 or 36 is applied to the input of electrical summer 42 which is combined with a signal from a potentiometer 48, utilized to set the level of the water flow in a manner more fully described below. It should be noted that if the turbine is operating on a mixture of gas and oil fuel, the system operates through functional swith 38 as if it was completely on oil fuel.

The computational section 16 receives its input from the output of the functional summing network 42 which is connected to another functional summing network 50. The output from the functional summing network 42 is referred to as the water reference signal Y since this signal contains the water adjust signal from potentiometer 48.

Considering now the computational section 16 in greater detail, the output of the functional summing network 50 is connected to a deadband circuit 54 which provides no output unless the error signal from the summing network 50 exceeds a predetermined threshold selected by the deadband circuit 54. The output of the deadband circuit is connected to a constant multiplier 56 which in turn has its output connected to a step generator 58 which provides output pulses to an incremental control valve actuator 60 of control valve 62.

The water flows through the control valve 62 and is sensed by a flow sensor 64 which has its output connected to the input of the maximum signal selector 52. The other input to the maximum signal selector 52 is derived from a valve position indicator 67 which may, for example, be a linear variable-differential transformer (LVDT) connected to the valve shaft. The displacement of the valve is thereby sensed and provided as an input signal to the maximum signal selector 52 through a constant multiplier 68.

Before describing the operation of the fuel monitoring section and computational section, a brief discussion of the water flow is presented to enable a better understanding of how water injection into a gas turbine is achieved. As illustrated in FIG. 1, a source of water is provided to a pump 70 with the water being filtered through a filter 72. The water then passes through a flow sensor 64, a stop valve 74 and then either through the control valve 62 or through both control valve 62 and a transfer valve 76 which is enabled by the function generator 78 whenever the output of the maximum signal selector exceeds a predetermined threshold. The output of the transfer valve and the control valve 62 are connected to the high and low sections respectively of a dual manifold supply 80 for the fuel nozzles of the gas turbine.

By way of example, the pump 70 may be a single-stage, centrifugal-type pump equipped with an inducer at the suction end to reduce pump requirements. The filter 72 may be of five-micron size located on the discharge side of the pump to prevent foreign object contamination of other control devices or the water injection nozzles. The control valve 62 is preferably a Fisher Type 184 flow controller, having a linear flow versus stroke characteristic which is adapted to a linear actuator. As described above, the valve stroke is sensed through the linear-variable differential transformer 67. The incremental actuator 60 may be an electric stepping motor type linear actuator controlled by the digital pulses from the step generator 58, with the piston of control valve 62 incrementally moving a small amount (e.g., 0.005 inches) per pulse.

Figure 2:
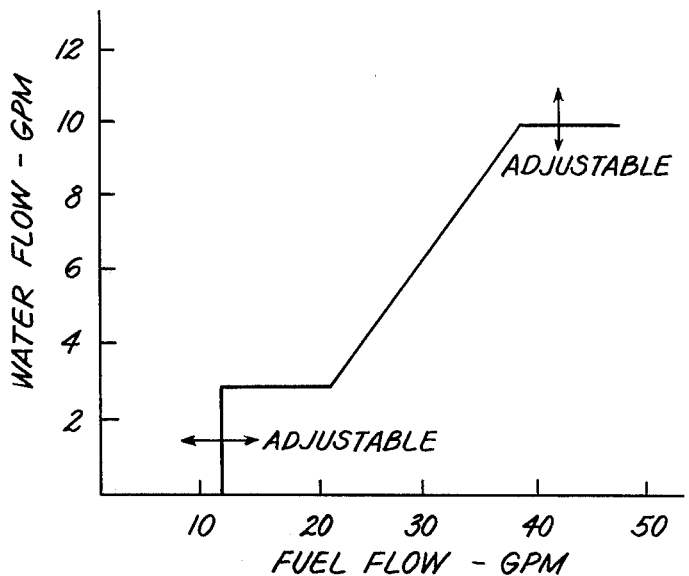
FIG. 2 illustrates a typical water to fuel control schedule for a typical gas turbine.

Operation of the water injection control system 10 will now be described with reference to FIGS. 1 and 2. Assume that oil fuel is being utilized in the gas turbine and that the gas turbine speed is in excess of 95% of full speed and that the water system is functioning properly. Under these conditions, switch 38 is closed and an electrical signal is applied to functional summer 42 which is summed with the water adjust signal from potentiometer 48. The output signal of the summer 42 is then applied to the summer 50 which produces an error signal for the deadband circuit 54 proportional to the selected water flow rate and the actual water flow rate to the dual manifold supply 80. The error signal is determined by sensing the water flow with flow sensor 64, the output of which provides a signal to the maximum signal selector 52. Additionally, the position of the shaft of the control valve 62 is sensed by the LVDT (Linear Variable Differential Transformer) 67 which provides an electrical signal proportional to shaft position to a constant multiplier 68. The output of the maximum signal selector is the greater of the two input signals. The error signal from the functional 50 is then applied to the deadband circuit 54 which includes a predetermined threshold above which the error signal must exceed to cause an output signal to be applied to the constant multiplier 56. Assuming, for the moment, that the error signal exceeds the deadband limit, the step generator 58 issues a plurality of digital pulses proportional to the magnitude of the error signal. For example, if the error signal is at a maximum, thirty pulses are issued from the step generator 58 which causes the incremental actuator 60 to open or close the control valve 62 in accordance with the sensed direction of error. On the other hand, if the magnitude of the error signal is less than a maximum, a lesser number of pulses depending upon the magnitude of the error will be applied to the actuator and the valve will be opened or closed a lesser amount.

The total water flow to the turbine is scheduled as a function of fuel flow. FIG. 2 illustrates a typical water-to-fuel schedule for a gas turbine offered for sale by General Electric Company as the MS-5001. As illustrated, the water-to-fuel schedule curve is adjustable depending upon field tests of the unit. This adjustment is accomplished by the water adjustment level potentiometer 48. It should be noted that the maximum and minimum flow limits and flow cutoff at low fuel flow are adjustable to enable compliance with NOx emission requirements and further to prevent excessive invention of water into the combustion chambers of the gas turbine which may cause flame out.

The water injection control system also includes a transfer valve 76 which enables the control system to provide a two-level water distribution system for gas turbines requiring a high water flow turndown ratio to ensure adequate chamber to chamber flow distribution throughout the flow range. The transfer valve 76 is used to switch the water injection flow from the low flow distribution system to both the low and high flow distribution systems to ensure adequate water flow distribution between the uppermost combustion chamber and the lowest combustion chamber at the gas turbine. The transfer valve 76 is actuated whenever the magnitude of the signal from the maximum signal selector 52 exceeds a predetermined threshold established by the function generator 78.

The transfer valve 76 is preferably a rotary VEE-ball type capable of providing precision control which is necessary during the transfer period while offering the least flow resistance when the transfer is completed and the valve is wide open. The valve contains a housing which adapts to a linear valve actuator of a type similar to that used on the control valve 62.

The foregoing operation of sensing the fuel flow, the compressor inlet temperature and the water flow is performed periodically, preferably at approximately one second intervals, for example. Between each one second scan interval, the computational section 16 calculates the water error signal based on fuel flow and modifies the position of the control valve 62 to either increase or decrease the water flow rate to the dual manifold supply 80 in accordance with the water-to-fuel schedule. It should be noted that the pulses applied to the incremental actuator 60 of the control valve 62 all occur in a time period of less than one second so that the water flow transients occasioned by the valve movement have an opportunity to settle out (or dampen) before the next scan of data is taken, thereby ensuring a stable control loop.

Figure 3:
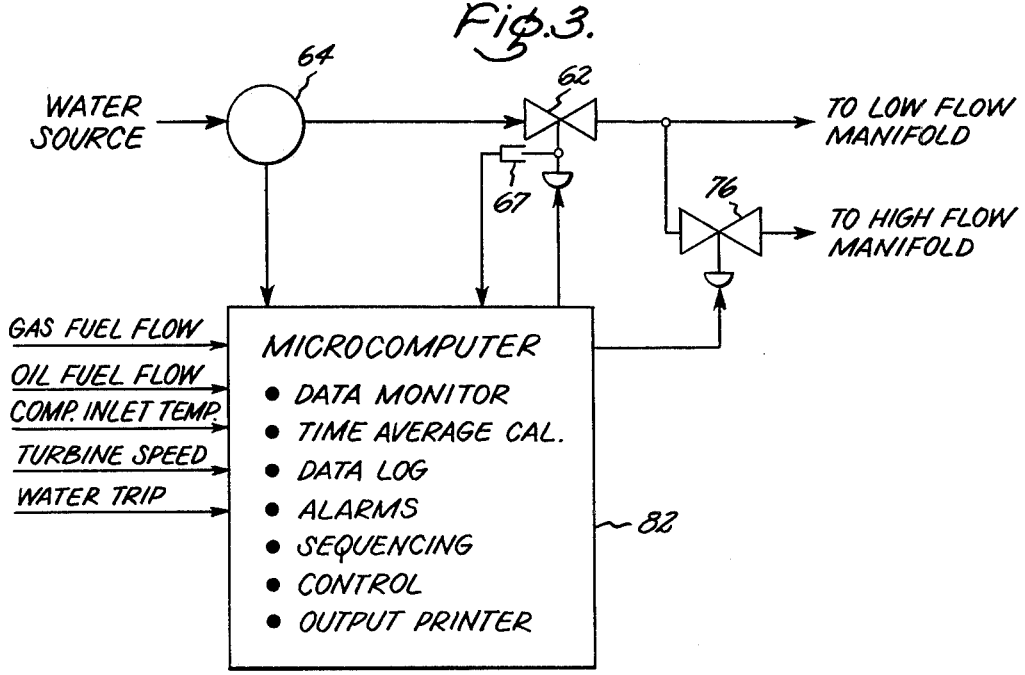
FIG. 3 illustrates an electrical control schematic diagram for a water injection system in accordance with the present invention.

FIG. 3 illustrates an electrical control schematic for the water injection control system 10 as including a microcomputer 82 to provide the necessary timing functions for operation of the control system and as will be described below, to provide a combustion monitor function which detects abnormal operation of the water injection system and the combustion system as more fully described in U.S. Pat. No. 4,115,998 to Gilbert et al.

As illustrated in FIG. 3, the microcomputer 82 includes appropriate input/output electronics, feedback transducers, interface logic and an output printer for recording all appropriate data upon the occurrence of a system malfunction. While the microcomputer 82 and the operation thereof are not considered a part of the present invention, it should be noted that the microcomputer is an integral part of the water injection system for the gas turbine control system. Both fuel flow and water flow are scanned and the data memory stored approximately every 60 seconds (control update is once every second) with the water-to-fuel ratio computed, compared to a required ratio and added to the time averaged calculation for a one hour period. This process is accomplished on a roll-over type basis with new data continuously added and data older than one hour removed from the calculations. Should the time averaged ratio (water-to-fuel) fall below the required ratio, an automatic alarm occurs with readout of all pertinent data for the time period of interest. Printouts from the microcomputer are useful in determining compliance with applicable emission requirements and for determining reasons for noncompliance with these requirements.

In summary, a water injection control system (which is applicable to steam injection as well) has been described for use with a gas turbine for reducing the emission of oxides of nitrogen in the turbine exhaust. The system includes periodic monitoring of the fuel and water flows, computation of a water error signal indicative of deviation from a prescribed water-fuel schedule and correcting the water flow through the use of an incrementally controlled control valve and a transfer valve to ensure compliance with the emission of oxides of nitrogen.

Those skilled in the art can readily appreciate that while the invention has been described with respect to a control system utilizing digital and analog techniques, a fully digital system using microcomputers with appropriate analog sensors and analog-to-digital converters could be employed without departing from the spirit and scope of the present invention. Accordingly, the claims are intended to cover all such modifications and variations.

What is claimed is:

1. A control system for the injection of water into the combustion chambers of a gas turbine for reducing the emission of oxides of nitrogen in the turbine exhaust, said system comprising:
  means sensing the fuel flow to said turbine and providing an electrical signal proportional to fuel flow;
  means sensing the water flow to the combustion chambers of said turbine and providing an electrical signal proportional to water flow;
  a water control valve for controlling the water flow to said combustion chambers;
  means for sensing the position of the shaft of said water control valve and providing an electrical signal proportional to shaft position;
  maximum signal selector means responsive to said electrical signal proportional to shaft position and said electrical signal proportional to water flow and providing an output signal having a magnitude equal to the larger of the shaft position signal and the water flow signal, and
  means responsive to said electrical signal proportional to fuel flow and said output signal from said maximum signal selector for computing a water error signal representative of the difference between the actual water-to-fuel flow and a predetermined water-to-fuel schedule, said water control valve responsive to said water error signal for maintaining the water flow to said combustion chambers in accordance with said predetermined water-to-fuel schedule.

2. The control system of claim 1 further comprising a transfer valve responsive to a predetermined magnitude of said output signal for ensuring adequate water flow distribution at low total flow between the uppermost combustion chamber and the lowest combustion chamber of the gas turbine.

3. A control system for the injection of water into the combustion chambers of a gas turbine for reducing the emission of oxides of nitrogen in the turbine exhaust, said system comprising:
  means sensing the fuel flow to said turbine and providing an electrical signal proportional to fuel flow;
  means sensing the water flow to the combustion chamber of said turbine and providing an electrical signal proportional to water flow;
  means responsive to said electrical signals for computing a water error signal representative of the difference between the actual water-to-fuel flow and a predetermined water-to-fuel schedule; and
  a water control valve characterized by a linear flow versus stroke characteristic, said valve responsive to said water error signal for maintaining the water flow to said combustion chambers in accordance with said predetermined water-to-fuel schedule.

4. The control system of claim 3 further comprising a control valve actuator, said actuator providing incremental movement of the shaft of said control valve in response to said water error signal.

5. The control system of claim 4 further comprising: generator means adapted to produce a plurality of pulses proportional to the magnitude of said water error signal, said pulses causing said actuator to incrementally move said valve shaft.

6. The control system of claim 5 further comprising a deadband circuit adapted to receive said water error signal and to provide an output signal to said pulse generator means whenever said water error signal exceeds a predetermined threshold level.

7. A control system for the injection of water into the combustion chambers of a gas turbine for reducing the emission of oxides of nitrogen in the turbine exhaust, said system comprising:
  means sensing the fuel flow to said turbine, said means including a function generator and providing an electrical signal representative of a predetermined water-to-fuel control schedule;
  means sensing the water flow to the combustion chamber of said turbine and providing an electrical signal proportional to water flow;
  means responsive to said electrical signals for computing a water error signal representative of the difference between the actual water-to-fuel flow and a predetermined water-to-fuel schedule; and
  a water control valve responsive to said water error signal for maintaining the water flow to said combustion chambers in accordance with said predetermined water-to-fuel schedule.

8. The control system of claim 7 further comprising a water level adjustment signal means and means for summing the water level adjustment signal means and said output signal representative of a predetermined water-to-fuel control schedule.

* * * * *